United States Patent [19]
Skinner

[11] 3,913,315
[45] Oct. 21, 1975

[54] SULFUR RECOVERY FROM FLUIDIZED BED WHICH HEATS GAS IN A CLOSED CIRCUIT GAS TURBINE

[75] Inventor: Geoffrey Frederick Skinner, Berkshire, England

[73] Assignee: Foster Wheeler Energy Corporation, Livingston, N.J.

[22] Filed: Jan. 10, 1974

[21] Appl. No.: 432,278

Related U.S. Application Data
[63] Continuation of Ser. No. 253,741, May 16, 1972.

[30] Foreign Application Priority Data
May 17, 1971 United Kingdom............... 15348/71

[52] U.S. Cl............................................. 60/39.18 R
[51] Int. Cl............................. F02c 7/02; F02c 1/00
[58] Field of Search . 60/39.18 R, 39.18 A, 39.18 B, 60/39.18 C; 122/4 D

[56] References Cited
UNITED STATES PATENTS

| | | | |
|---|---|---|---|
| 2,818,049 | 12/1957 | Blaskowski et al............. | 60/39.18 B |
| 2,959,005 | 11/1960 | Zaba.............................. | 60/39.18 R |
| 3,069,342 | 12/1962 | Flatt............................... | 60/39.18 R |
| 3,194,015 | 7/1965 | Paceult........................... | 60/39.18 B |
| 3,234,735 | 2/1966 | Pirsh et al...................... | 60/39.18 R |
| 3,481,834 | 12/1969 | Squires........................... | 60/39.18 R |
| 3,625,164 | 12/1971 | Spector............................ | 122/4 D |
| 3,645,237 | 2/1972 | Seth................................. | 122/4 D |
| 3,687,115 | 8/1972 | Bell................................. | 60/39.18 B |
| 3,756,029 | 9/1973 | Aguet............................. | 60/39.18 B |
| 3,763,830 | 10/1973 | Robinson et al.................. | 122/4 D |

Primary Examiner—William L. Freeh
Assistant Examiner—Thomas I. Ross
Attorney, Agent, or Firm—John E. Wilson; Marvin A. Naigur

[57] ABSTRACT

The invention described herein is a power plant in which energy is produced by means of a gas turbine driving, for example, an electric generator. The head for the gas turbine is produced by passing the compressed gas through tubes immersed in a fluidised bed burner, the heated gas then driving the turbine. In one preferred form of the invention the fluidised bed burner is fired with a sulfur contaminated fuel such as oil and the bed is constituted by particles, which will react with the sulfur. These sulfur-containing particles are then removed and the sulfur recovered by, for example, burning these particles to give $SO_2$ gas which can be used in the preparation of sulfuric acid. In this way, polution of the atmosphere which occurs with conventional power plants fired with sulfur contaminated fuels can be avoided and the sulfur recovered and used.

15 Claims, 3 Drawing Figures

SULFUR RECOVERY FROM FLUIDIZED BED WHICH HEATS GAS IN A CLOSED CIRCUIT GAS TURBINE

CROSS-REFERENCE TO RELATED APPLICATION

The present application is a continuation of application Ser. No. 253,741, filed May 16, 1972.

This invention relates to power generation. In particular the invention relates to a plant in which a fuel is burnt to provide heat which is then converted to electrical energy.

BACKGROUND TO THE INVENTION

In a conventional power station, coal or oil is burned and the heat produced is used to provide high pressure steam. This is then used to drive a turbine to produce the electricity. One factor which limits the overall efficiency of such plants is that, after the steam has been expanded in the turbine, it has to be condensed and the latent heat is therefore lost. This seriously reduces the overall efficiency of the plant. By adopting larger plants which work with higher pressure steam, slight increases in efficiency can be obtained.

It is therefore an object of this invention to provide a plant which can be developed to an efficiency at least comparable to that of the conventional steam boiler plant and which at the same time can be much smaller by comparison.

BRIEF DESCRIPTION OF THE INVENTION

According to the invention there is provided a power plant comprising a fluidised bed burner in which fuel is burnt to provide the heat and from which heat is extracted by heating a gas flowing from the compressor to the turbine of a gas turbine so as to drive the gas turbine, the turbine in turn being arranged to give an energy output such as by driving an electrical generator to give an electric energy output.

Such a plant can be relatively compact because very high heat outputs can be provided in small spaces in fluidised bed burners and the gas turbine itself also can be relatively compact as compared with a steam turbine in a conventional steam boiler power plant. In addition, temperatures within the fluidised bed are relatively even without hot spots and so the materials of the tubes and bed can be designed to operate near their limits of endurance. Further no phase change occurs in the gas used to drive the gas turbine and so one avoids losses of latent heat which occur when steam is condensed and the condensate is recycled to the boiler.

It is preferred that the fluidised bed burner be operated at a pressure which is almost identical with, i.e. within about 1 atmosphere of, the pressure of the gas being heated for the gas turbine. In this way the gas to be heated can be passed through tubes which are immersed in the fluidised bed and those tubes do not need to be particularly thick since they will not have to withstand large differential pressures. Because of the very high temperatures of the fluidised bed this is an advantage since it is much easier to design, and cheaper to provide, tubes which have to withstand high temperatures and no high differential pressures than tubes which have to withstand both high temperatures and high differential pressures simultaneously. The tubes can therefore be operated close to their limits of endurance and so can be comparatively cheap. By immersing the tubes in the fluidised bed one also can achieve very high heat transfer rates and this is, of course, assisted by the thin walls of the tubes. Although it is preferred to keep the pressures of gas in the fluidised bed and within the tubes at almost identical pressures, arrangements are desirably made to ensure that the pressure of the gas in the tubes is always slightly higher than that within the fluidised bed burners so that in event of a tube failure solids are not drawn from the fluidised bed into the gas turbine to damage the blades of the turbine.

By keeping the gas being heated and the fluidised bed at roughly the same pressure as one another, the parts of the plant can be operated at a constant temperature with changes in load being accomodated by changes in pressure and so mass flow. Therefore, beacuse the gas velocities through the various parts of the plant can be substantially constant, the plant can operate at virtually constant efficiency over a wide range of loads, e.g. from 20 to 100% of full output, simply by adjusting the pressures and consequently the mass flow.

In addition, very rapid changes in load can be accomplished without problems of thermal explansion because of the constant temperature which is maintained throughout the load range. The gas heated for use in the gas turbine can be heated to relatively high temperatures, e.g. over 800°C and this leads to an efficiency for the gas turbine which can be comparable with that of a steam turbine. Also the turbine parts can be relatively small as compared with the steam turbine of a conventional power plant because they operate at higher gas outlet pressure than steam turbines and so handle less fluid.

It is preferred that the gas turbine be operated as a closed cycle. Thus, the gas can circulate continously from the compressor, be heated, pass to the expansion turbine to perform work and then return to the compressor. Alternatively the gas can be circulated from a common compressor, be heated, pass to the expansion turbine, and thereafter return to the common compressor which also provides compressed air for supply to the fluidised bed for combustion. In the latter case there is of course the advantage that the pressures of the gas being heated and the gas in the fluidised bed burner must be substantially identical without the need of special control equipment.

Waste heat is rejected from the gas turbine loop by cooling the gas in any suitable way. This can be achieved by for example passing the gas in heat exchange with cooling water or an air stream. Since the waste heat is rejected at a much higher temperature than is the case with steam power plant, when the gases are cooled by heat exchange with cooling water one needs much less cooling water per unit of heat rejected. In the plant according to the invention the only water required would be this cooling water and so one can avoid having to supply a complex and expensive demineralisation plant as is required to purify water for use in a conventional steam boiler.

In the case where the gas turbine is operated as a completely closed loop, the gas used for this can be for example, helium or carbon dioxide. The advantage of employing helium is that the rate of heat transfer to helium can be very high while the advantage of employing carbon dioxide is that it can be used at pressures near its condensation point and it is therefore more efficient to compress. In order to ensure that the pressure of the gas in this closed loop passing through the tubes immersed in the fluidised bed burner is at a pressure almost identical with that of the pressure in the fluidised burner, the cycle is controlled accordingly and means are provided to vent the gas from the loop in the event of an emergency shut down of the plant so as to avoid damage to the tubes immersed in the fluidised bed.

In the case where the gas turbine and the fluidised bed have a common compressor, the gas flowing through the gas turbine cycle will of course be air. In this case there is no necessity to provide for emergency venting in the case of an emergency shut down of the plant.

The fluidised bed burner can use as the combustible material coal or other solid combustible particles. In this case the bed will consist of a large number of ash particles in which are mixed a relatively small number of combustible particles. The fluidised bed burner can also use a gas, e.g. natural gas, or liquid combustible fuel, e.g. fuel oil, together with inert solid refractory particles which constitute the bed.

In one advantageous form of the invention the fluidised bed burner uses a fuel oil as the combustible material and this is fed into a fluidised bed of solid particles. In the case where the fuel oil contains substantial sulphur and vanadium contaminents and the bed consists of solid particles which are, for example, carbonates or oxides of calcium and/or magnesium, by adjusting the quantity of air in the fluidised bed the particles can be arranged to remove the sulphur from the fuel oil in the form of a calcium and magnesium sulphide. These sulphide particles can then be removed and burned in excess air to give oxide particles which are returned to the bed and sulphur dioxide which can then, for example, be used in the preparation of sulphuric acid. By adopting this expedient one can of course put to use the sulphur which would otherwise be wasted and polute the atmosphere.

In one form of the invention the fluidised bed burner can consist of a pair of fluidised beds arranged in series one above the other. The lower bed is arranged to be supplied with a sulphur contaminated fuel oil and will contain, for example, calcium oxide particles. This bed is operated in the presence of a relatively low proportion of excess air, e.g. 15%, and in this way the sulphur in the fuel oil reacts with the calcium oxide to give calcium sulphide particles. The hot waste gases from this bed pass upwardly to the upper bed and in that bed fluidise particles of calcium oxide. Immersed in that upper bed are heat exchanger tubes through which the gas from the gas turbine passes to be heated. The upper bed is supplied continuously with a fresh supply of calcium carbonate particles to make up for losses and in that upper bed these fresh calcium carbonate particles are decomposed by the high temperatures to give calcium oxide particles which pass down to the lower bed where they are used for removing the sulphur. From the lower bed a portion of the sulphur containing particles are arranged to be withdrawn continuously and the sulphur is removed from these particles by heating them in a further fluidised bed in the presence of an excess amount of air to give calcium oxide particles which are then restored to the lower bed and sulphur dioxide which is, for example, passed to a Claus type plant to recover the sulphur. Instead of withdrawing the sulphur containing particles from the lower fluidised bed they can be burnt in a zone of that bed with excess air and the $SO_2$ produced removed through an outlet separate from the flue gases.

If desired not all of the tubes in which the gas flowing through the gas turbine is heated need be immersed in the fluidised bed. Preferably most of the tubes are immersed in the bed because of the very high transfer rates which can be achieved but some of the tubes may in fact be positioned above the bed and be convection tubes swept by the hot gases from the bed.

Additionally a number of serially connected fluidised beds may be provided which operate at decreasing temperatures in the direction of the hot combustion gases towards the flue, the gas for the gas turbine being heated progressively by the cooler then the hotter beds by passing through tubes immersed in the beds.

In order to increase the output from the plant according to the invention one can provide a number of fluidised beds in parallel so as to heat a larger amount of hot gas for use in the gas turbine.

BRIEF DESCRIPTION OF THE DRAWINGS

The invention will now be illustrated by way of example with reference to the accompanying drawings, in which.

DESCRIPTION OF THE PREFERRED EMBODIMENTS

Figure 1:
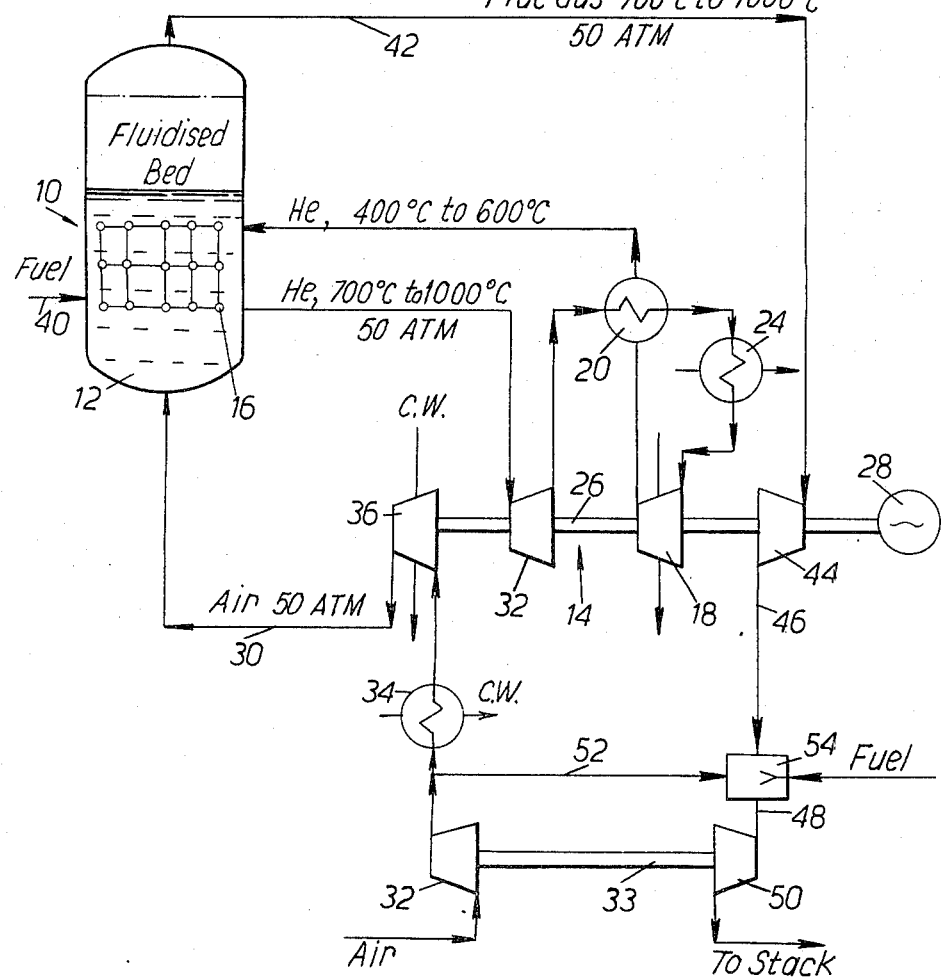
FIG. 1 is a flow diagram of one form of power plant according to the invention.

The plant 10 shown in FIG. 1 includes a fluidised bed burner 12 and a closed cycle gas turbine 14. Fuel is burnt in the fluidised bed 12 and the heat produced is used to heat gases passing through tubes 16 immersed within the fluidised bed, this hot gas then being used to drive the gas turbine 14.

The gas turbine includes a compressor 18 in which the gas in the closed cycle is compressed, a heat exchanger 20 to which the compressed gases pass and are preheated before passing to the tubes 16. The hot gases from the tubes 16 immersed in the fluidised bed then pass to the expansion turbine 22 in which they expand and do useful work. Thereafter the gases which are still relatively hot pass to the heat exchanger 20 where they pass in heat exchange with the gases from the compressor and preheat those gases. These gases then pass to a further heat exchanger 24 in which they are cooled before being returned to the compressor 18. The cooling medium used for the heat exchanger 24 can be air or cooling water. The compressor 18 and expansion turbine 22 are mounted on a common shaft 26 which is also linked with an electric generator 28 and the excess power produced by the expansion turbine 22 over that absorbed by the compressor 18 is used by the generator 28 to produce electrical output.

The fluidised bed burner 12 is fed with compressed air through a line 30. Air is initially compressed by means of a compressor 32 mounted on a shaft 33. This air is then cooled in a heat exchange with, for example cooling water, and the cooled precompressed air is then passed to a compressor 36 which is mounted on the shaft 26. Compressed air from the compressor 36 passes via the line 30 to the fluidised bed 12.

In the fluidised bed burner 12 the compressed gases from the line 30 are used to fluidise the particles and fuel supplied through an inlet 40 is burnt in the air. The hot waste combustion products leave the fluidised bed burner through line 42 and pass to an expansion turbine 44 also mounted on the shaft 26. After expansion in that turbine the waste gases then pass through lines 46 and 48 to a low pressure expansion turbine 50 mounted on the shaft 33 and thence to a stack (not shown). The compressor 32 and turbine 50 are mounted on the common shaft 33 and operates without external load. This provides for flexibility of operation of the plant over a wide load range.

Because the turbines 22 and 44 are relatively small and so relatively inexpensive, they can be made to be replacable after a fairly short operating life, e.g. 20,000 hours, so facilitating their operation at high temperatures.

In order to start up the plant and to provide control during operation a small part of the compressed air from the compressor 32 is passed through a line 52 to a burner 54 positioned between the lines 46 and 48. In this burner, fuel is burned in the mixtures of waste gases and gases from the line 52 and then passed to the stack through the expansion turbine 50.

The closed cycle gas turbine can contain helium as the gas. This cycle is arranged to operate in the well-known way for gas turbines. The heat exchanger 20 is a tube and shell heat exchanger having a comparatively large heat exchange area so as to give good heat exchange since the two flows of gas in heat exchange have generally only about 20° to 50°C temperature difference.

The plant is operated so that the fluidised bed is maintained at a substantially constant temperature, e.g. 800°C. This temperature should be as high as possible so as to improve the efficiency of the system.

The compressors 32 and 36 are then operated in such a way and at such a speed that the pressure in the fluidised bed is kept as closely as possible proportional to the fuel fired, i.e. proportional to the output required. In this way one maintains an approximately constant gas velocity in the fluidised bed 12 and one can therefore maintain a substantially constant fluidised bed volume throughout the normal working range of the plant output. As the power output required increases, however, the mass flow through the bed will increase and the pressure will increase but the gas velocity can then be kept substantially constant.

The pressure of the gas in the enclosed cycle gas turbine is also adjusted in correspondence with the pressure in the fluidised bed burner so as to maintain the pressure of gas in the tubes 16 substantially equal to the pressure of the gas in the fluidised bed over the range of operating outputs. In this way the differential pressure across the tubes 16 can be kept relatively low at all times, e.g. less than about 1 atmosphere, and so these tubes 16 can be relatively thin walled tubes. This reduces their cost, makes them more reliable in operation and enables rapid heat transfer rates to be achieved between the fluidised bed particles and the gas in the tubes 16. In addition it is desirable to maintain the pressure of the gas within the tubes 16 very slightly higher than the pressure of gas in the fluidised bed so that in the event of the tube failure solid particles do not pass into the closed cycle system and cause damage to the blades of the expansion turbine 22.

By way of example the input air to the fluidised bed can be at say a pressure of about 50 atmospheres, while the bed operates at a temperature of about 800° to 1000°C, and the output combustion gases are about 50 atmospheres and 700° to 1000°C. In the closed cycle gas turbine, the input to the tubes 16 will be at about 400° to 6000°C while the output can be 700° to 1000°C and these very high input temperatures to the turbine 22 enable one to achieve high efficiences for the plant and in particular for the closed loop gas turbine.

Although the compressor 36 and expansion turbine 44 are shown as mounted on the shaft 26 in common with the turbine 22 and compressor 18 and generator 28 they could instead be mounted on a separate common shaft.

The compressors 32 and 36 can be provided with adjustable blading to provide increased flexibility of operation for the plant.

Although not shown in the drawings an emergency accumulator may be connected to the gas turbine cycle and the high pressure hot gases may be vented into this in the event of an emergency shut-down of the fluidised bed.

Because the gas to be cooled in the heat exchanger 24 is at a much higher temperature than steam to be condensed in a conventional steam boiler power plant, one can therefore use relatively small amounts of cooling water. Alternatively the gases can be cooled in the heat exchanger 24 by an air blast.

If desired suitable heat exchangers can be provided for preheating the combustion air before it enters the fluidised bed and for recovering heat from the flue gases before they pass to the stack.

The fluidised bed burner can be operated with a suitable fuel such as coal particles or a gaseous or liquid fuel together with inert particles. In a particularly advantageous embodiment of the invention the fluidised bed burner is in the form shown in FIG. 3 to be described in due course.

Figure 2:
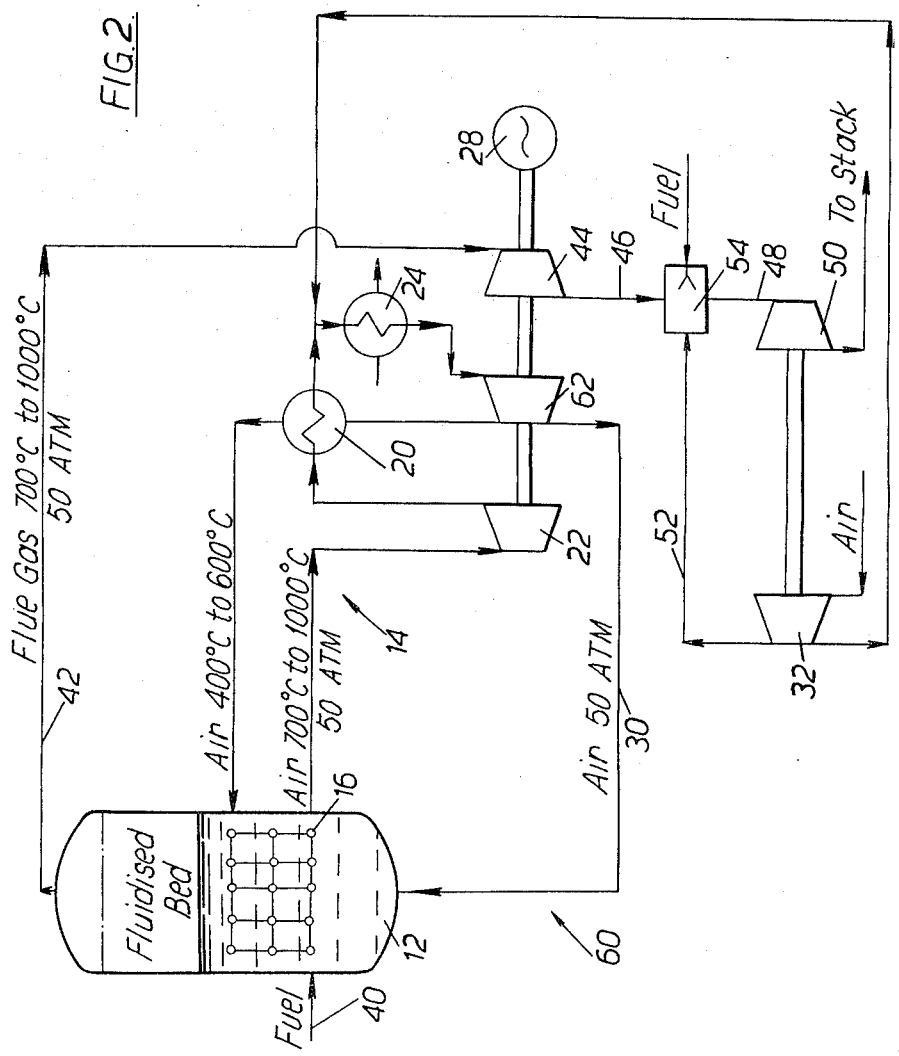
FIG. 2 is a flow diagram of a second form of the invention.

In the plant 60 shown in FIG. 2 of the drawings parts which are similar to the parts shown in the plant 10 of FIG. 1 have been given the same reference numerals and will not be described in detail.

The plant 60 differs from the plant 10 in that a common compressor 62 is provided both for the gas turbine 14 and for supplying air to the fluidised bed burner 12. This plant has the important advantage that the pressure of air within the tubes 16 must of necessity be almost identical with the air pressure within the fluidised bed burner 12. Again therefore the tubes 16 can have relatively thin walls and in addition it is not necessary to provide means for venting the air within the gas turbine 14 in the event of an emergency shut-down.

In other respects the plant 60 has similar advantages to the plant 10 shown in FIG. 1.

Figure 3:
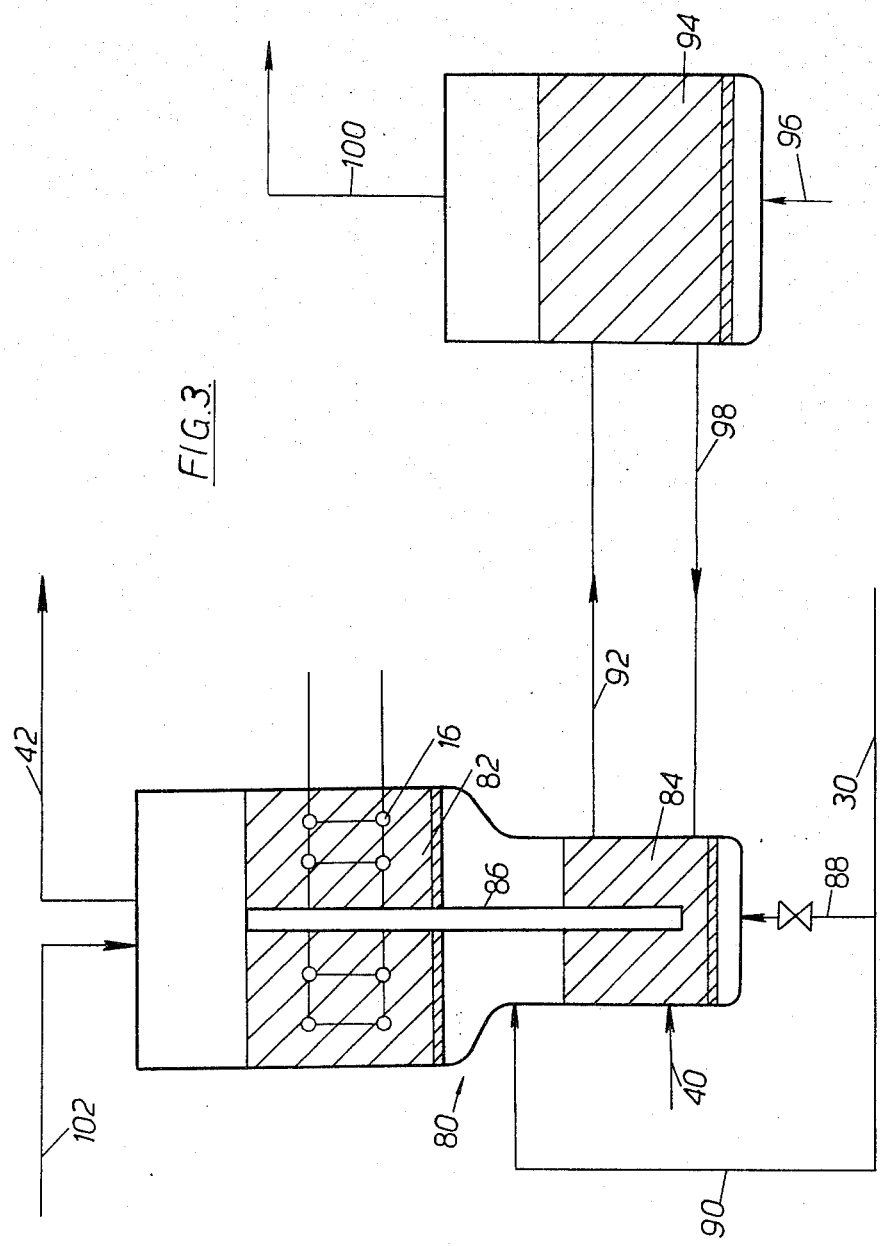
FIG. 3 is a flow diagram of a modified fluidised bed burner for use in either the plant shown in FIG. 1 or FIG. 2.

The preferred form of fluidised bed burner for use in the plants shown in FIGS. 1 and 2 is shown in FIG. 3. This burner 80 consists of an upper fluidised bed 82 in which the tubes 16 are immersed and a lower fluidised bed 84. An overflow 86 is provided for particles to travel from the upper bed to the lower bed so as to maintain the height of the bed 82 constant.

To the lower bed 84 is supplied fuel through a line 40 e.g., a gaseous fuel oil or natural gas containing sulphur contaminants, plus sufficient air to give a small excess e.g. 15 percent over that required to burn the fuel, through a line 88, the major part of the air from the line 30 being supplied through a line 90 to the upper bed 82.

The particles in the lower bed, are for example, calcium or magnesium oxide particles and under the conditions at which the bed is worked with a relatively low excess proportion of air, sulphur from the fuel reacts with the oxide particles to give calcium or magnesium sulphide particles.

The hot combustion gases from the bed 84 together with other unburned gases pass upwards and are mixed with excess air supplied through the line 90 and then pass into the bed 82. In that bed complete combustion occurs of the now desulphurised fuel oil and the heat output is used to heat the gas in the tubes 16 to drive the gas turbine 14 shown in FIGS. 1 and 2. Hot flue gases leave the burner through the line 42.

A continual withdrawal of particles from the lower bed 84 takes place through a line 92. These particles are passed to another fluidised bed 94. In the latter bed they are fluidised in the presence of an excess quantity of hot air from the line 96 and the calcium or magnesium sulphide reacts with the air to give sulphur dioxide and calcium oxide particles. A continuous return of calcium or magnesium oxide particles is taken from the bed 94 via the line 98 to the bed 84. The gases from the bed 94 containing $SO_2$ leave via a line 100 and the sulphur dioxide is recovered, for example, in a Claus type plant to prevent their poluting the atmosphere and to use them in the production of sulphuric acid. The sulphur recovery plant can be operated at roughly the same pressures as the fluidised bed 82 and so the tail gases from the sulphur recovery plant can be expanded through the turbine 44 of the plants 10 and 60 to recover some energy from them.

In order to make up for losses of particles leaving the bed 82 a small supply of fresh particles are added to the bed 82 through the line 102. These particles can, for example, be calcium carbonate particles which decompose at the high temperatures existing within the bed 82 to give the required calcium oxide particles.

It will be appreciated that by using the fluidised bed 80 shown in FIG. 3 one has the additional advantage that the plant according to the invention will not polute the atmosphere with large quantities of sulphur dioxide and instead that sulphur dioxide is put to a useful purpose in the production of, for example, sulphuric acid.

A latitutde of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

We claim:

1. A power plant comprising:
   a fluidised bed burner;
   means for firing said fluidised bed burner to operate at a given pressure;
   tubes positioned so that they are immersed within said bed burner during operation of said burner;
   a gas turbine, said gas turbine having a compressor of a capacity and operating pressure for compressing gas to be heated to a pressure within one atmosphere greater than said given pressure and an expansion turbine for expanding heated compressed gas and extracting energy therefrom;
   a power generator driven by said gas turbine;
   a conduit for passing compressed gas from said compressor to said tubes for heating said compressed gas; and
   a conduit for passing said heated compressed gas from said tubes to said expansion turbine.

2. A power plant according to claim 1 further comprising a cooler and a heat exchanger, said compressor, said heat exchanger, said tubes, said expansion turbine and said cooler being in a closed loop so that gas passes from said compressor to said heat exchanger for preheating, to said tubes for heating, to said expansion turbine, to said heat exchanger to preheat said gas, to said cooler and back to said compressor.

3. Power plant according to claim 2 in which said gas circulating in said closed loop is helium.

4. Power plant according to claim 2 further comprising an emergency accumulator into which said gas in said closed loop can be vented in the event of a shutdown of said plant.

5. A power plant according to claim 2 further comprising a second compressor for compressing air, an air line connected with said compressor and said fluidised bed for feeding said compressed air to said fluidised bed; a flue gas expansion turbine; a flue gas line connecting said flue gas expansion turbine and said fluidised bed and a common shaft on which said compressor and expansion turbine of said gas turbine and said air compressor and flue gas expansion turbine are all mounted so that when said compressor and said expansion turbine of said turbine operate, said air compressor forces air through said air line into said fluidised bed and said flue gas expansion turbine is energized by flue gas.

6. Power plant according to claim 1 further comprising means for operating said fluidised bed burner at elevated pressures, said means including said compressor which compresses gas both for said gas turbine and for combustion in said fluidised bed burner, and a turbine for expanding and recovering energy from said combustion gases, the air expanded in said turbine of said gas turbine being passed back to said common compressor.

7. Power plant according to claim 6 wherein said common compressor, said turbines, and said power generator are all mounted on a common shaft.

8. Power plant according to claim 6 in which said gas turbine further comprises a heat exchanger and a cooler, said air from said common compressor passing to said heat exchanger for preheating, to said tube means for heating, to said expansion turbine, to said heat exchanger to preheat said compressed air, to said cooler and back to said common compressor.

9. Power plant according to claim 2 further comprising an exit turbine through which hot combustion gases pass for expansion before venting to the atmosphere, and a pre-compressor driven by said exit turbine to compress air for combustion in said burner.

10. Power plant according to claim 9 further comprising a burner, means for passing compressed air from said pre-compressor to said burner, and for passing combustion products from said burner to said exit turbine to assist control and start-up of said plant.

11. Power plant according to claim 1 in which said fluidised bed burner contains non-combustible fluidising particles capable of reacting with sulfur contaminants in fuel, means for removing sulfur containing particles from said burner and means for the recovering and use of said slufur.

12. Power plant according to claim 11 wherein said non-combustible particles are chosen from the group consisting of calcium oxide and magnesium oxide and said sulfur containing particles are calcium sulfide and magnesium sulfide respectively.

13. Power plant according to claim 11 further comprising means for burning said sulfur containing particles in air to give sulfur dioxide, and means for converting said sulfur dioxide to sulfuric acid.

14. Power plant according to claim 13 wherein said means for burning said sulfur containing particles is a fluidised bed.

15. Power plant according to claim 11 wherein said fluidised bed burner comprises:
 an upper fluidised bed of non-combustible particles,
 a lower fluidised bed of non-combustible particles capable of reacting with sulfur,
 means for passing fluidising air in series to said lower bed and then to said upper bed,
 means for supplying sulfur contaiminated fuel to said lower bed for partial combustion and reaction of said sulfur with said particles,
 means for supplying further air to said upper bed to complete combustion of said fuel, said tube means being arranged within said upper bed, and
 recovering sulfur from said particles removed from said lower bed.

* * * * *